May 19, 1925.

E. P. HUMPHREY

SEPARATOR FOR COAL AND ORE

Filed Feb. 26, 1924    2 Sheets-Sheet 1

1,537,947

INVENTOR.
Effingham P. Humphrey
BY
ATTORNEY.

May 19, 1925.
E. P. HUMPHREY
SEPARATOR FOR COAL AND ORE
Filed Feb. 26, 1924          2 Sheets-Sheet 2
1,537,947
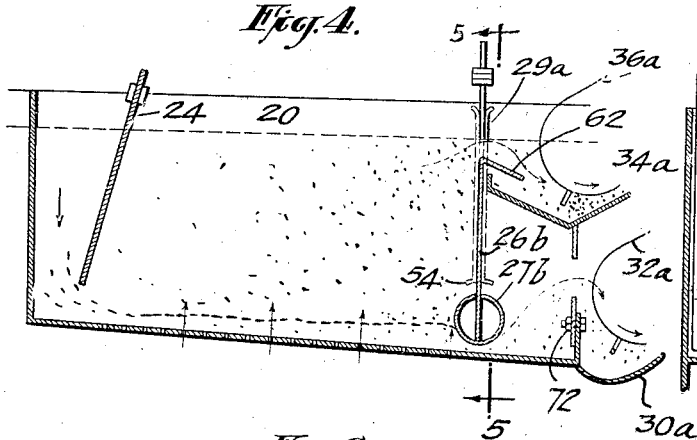
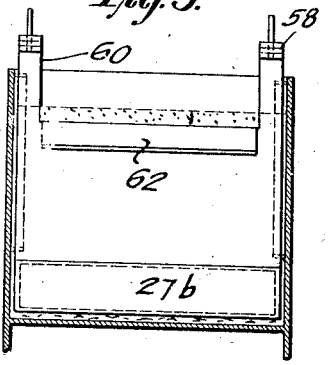
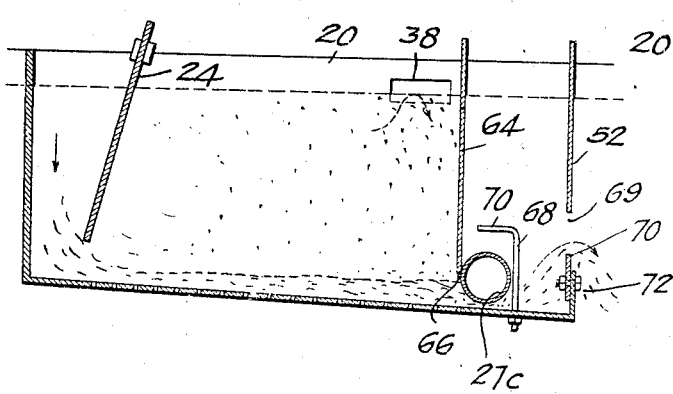
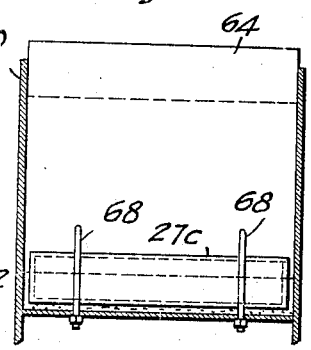
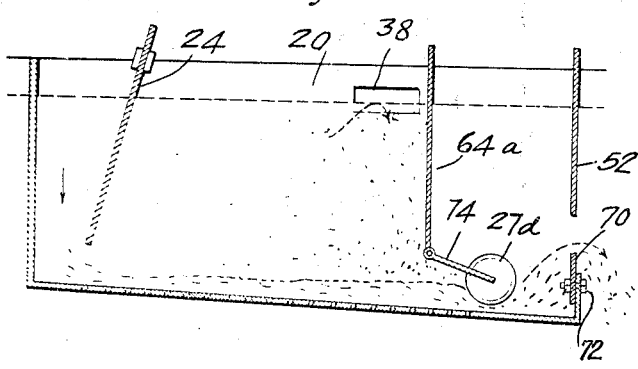
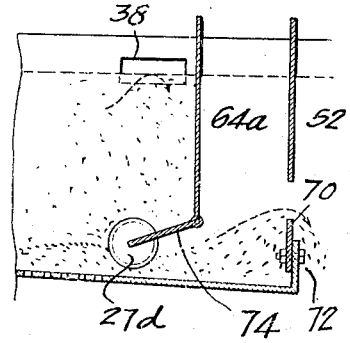
INVENTOR.
Effingham P. Humphrey
BY
ATTORNEY.

Patented May 19, 1925.

1,537,947

UNITED STATES PATENT OFFICE.

EFFINGHAM P. HUMPHREY, OF UPPER LEHIGH, PENNSYLVANIA.

SEPARATOR FOR COAL AND ORE.

Application filed February 26, 1924. Serial No. 695,240.

*To all whom it may concern:*

Be it known that I, EFFINGHAM P. HUMPHREY, a citizen of the United States, and resident of Upper Lehigh, in the county of Luzerne and State of Pennsylvania, have invented certain new and useful Improvements in Separators for Coal and Ore, of which the following is a specification.

This invention relates to hydraulic jigs for separating materials of different specific gravities and particularly to the means for regulating the rate of discharge of the separated materials.

The invention is exemplified in the accompanying drawings in which Fig. 1 is a vertical section through a jig illustrating one embodiment of the invention;

Figs. 4 and 5 are views illustrating an alternative construction, Fig. 5 being a section on line 5—5 of Fig. 4;

Figs. 6 and 7 are longitudinal and transverse sections respectively of a modified form of the invention; and Figs. 8 and 9 illustrate further modifications.

Figure 1:
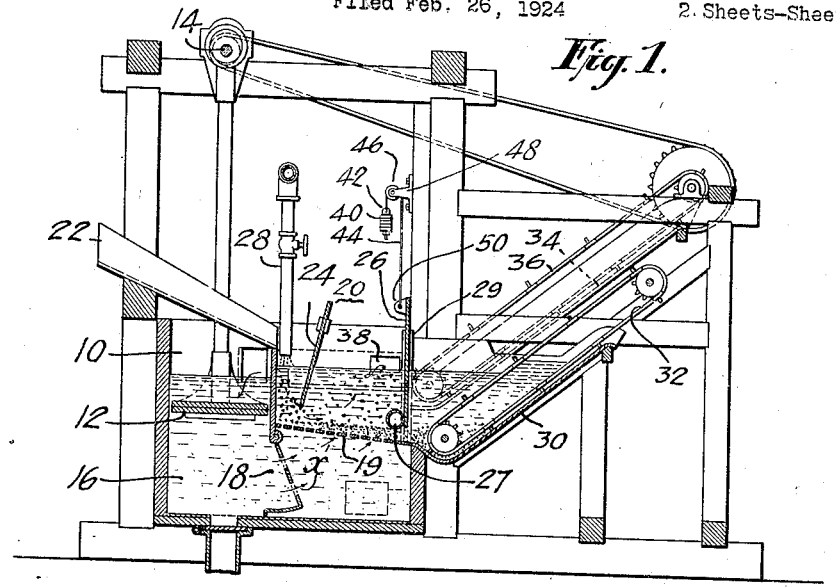

Referring in detail to the drawings, the jig includes a plunger chamber 10 within which a plunger 12 is reciprocated by means of a suitable eccentric 14 so as to agitate the body of water 16 and force it substantially in the direction of the arrows $x$ through the pump tunnel 18 and upwardly through the perforations in the bottom 19 of a separating compartment indicated generally by numeral 20. The mixture to be separated is fed through a chute 22 to the separating compartment 20 and the usual battery plate 24 is secured within the compartment to prevent the mass of material from striking or piling up on the discharge control gate 26 hereinafter more fully referred to. A water feed pipe 28 is conveniently located above the compartment 20 for replenishing the water from time to time although in the particular type of jig shown, the same water is used repeatedly.

The jig is provided with a conveyer box 30 having a flight conveyer 32 operating therein and adapted to carry off the gangue or slate separated from the ore or coal. Located on each side of the conveyer 30 there is a similar conveyer box 34 as shown in dotted lines in Fig. 1 and a similar conveyer 36 operates therein and is adapted to carry off the ore or coal which has been separated in the compartment 20 from the waste product.

The coal or ore separated is discharged through a suitable opening or openings 38 into a trough or coal discharge box which empties into the conveying box 34. The slate or gangue is discharged from the lower portion of the separating compartment 20 directly into the conveying box 30.

The rate of discharge of the refuse is controlled by the vertically movable barrier 26.

The type of separating jig thus far described is of typical construction and in the art is known as the Ransom hydraulic jig. My invention however can be applied to different forms of jig and is merely shown in connection with this form for the purpose of illustration, and it is not to be construed that I am limited in any way to this particular type as the following description will show that the invention is applicable to various designs of jigs quite regardless of the disposition of the conveyers, plunger compartments and other structural features of a hydraulic jig.

The invention is directed chiefly to means for controlling the rate of discharge of the different materials being separated. It is customary in most jigs of which I am aware to adjust the barrier 26 vertically by manual operation so as to vary the area of the opening between the bottom edge of the barrier and the bottom 19 of the separating compartment. My invention contemplates effecting this adjustment automatically by means of a float directly attached to the barrier, said float being adapted to be buoyed up by the slate or gangue which accumulates on the bottom 19 of the separating compartment. It is known in this art that as the plunger is reciprocated, the coal and slate for example are stratified, the coal or ore being lighter rising to the top and discharging through the chute 38 and the gangue or slate settling at the bottom. It is clear that with a float adapted to be supported on or buoyed up by the gangue or slate, will rise and fall according to the amount of slate (or gangue) accumulated on the bottom of the separating compartment. This rise and fall of the barrier will control the rate of discharge of slate or gangue from the compartment 20 to the conveyer box 30

I have illustrated several alternative arrangements for controlling the rate of discharge of materials being separated. In Fig. 1, for example, the float 27 is secured to one face of the barrier 26 near the lower edge thereof, this barrier being loosely guided between suitable guides 29 and adapted to move freely therein in response to buoyant effect of the material accumulated on the bottom of the separating compartment. As shown in this figure, I may counter-balance the weight of the barrier and float by means of adjustable weights 40 carried on an eye-bolt 42 secured to a cable 44 which passes over a suitable guide sheave 46 carried by a bracket 48 mounted on one of the uprights of the jig, the lower end of the cable being secured to an ear or projection 50 secured to the barrier 26.

Figure 2:
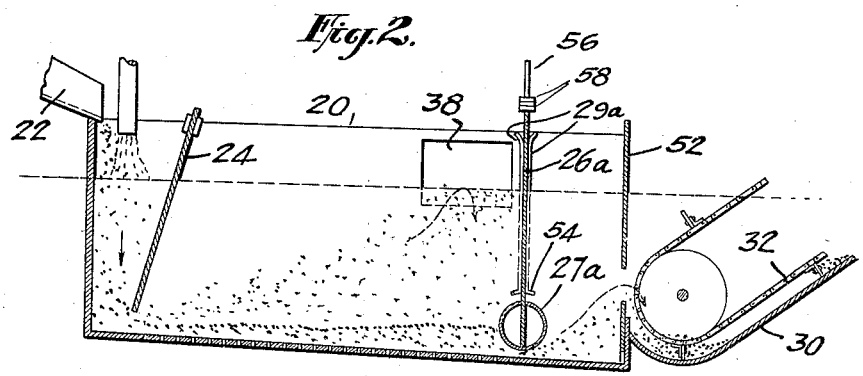
Fig. 2 is an enlarged detail of the separating compartment of the jig shown in Fig. 1.
Figure 3:
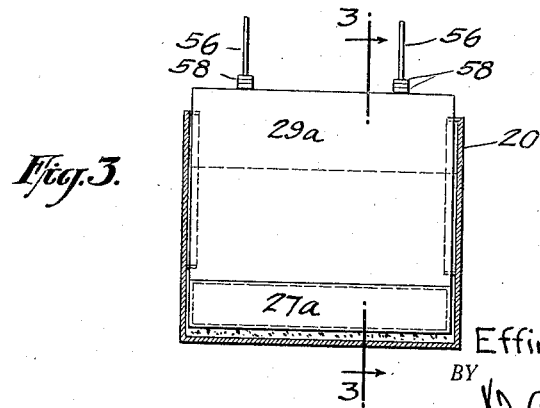
Fig. 3 is a transverse section on line 3—3 of Fig. 2.

In Figs. 2 and 3 I have shown a slightly modified arrangement wherein the barrier 26$^a$ is spaced away a short distance from a wall 52 of the separating compartment which is located between said compartment and the conveyer box 30. In this arrangement the float 27$^a$ is located centrally under the barrier and the latter is guided in suitable guides 29$^a$ having stops 54 at the lower end thereof to limit the upward motion of the barrier. Stems 56 are secured to the top of the barrier 29$^a$ and are adapted to receive adjusting weights 58 so that a nice adjustment of the combined weight of the barrier and float may be obtained so as to regulate the device according to the particular specific gravity of one of the materials to be separated.

The float in reality forms the barrier which controls the discharge of one of the separated materials and this float may be filled with gas or air or other material so as to render it more or less buoyant.

In some cases, the floating barrier will control both classes of materials being separated, the lower part of the barrier controlling the discharge of slate or gangue and the upper part thereof controlling the discharge of coal or ore. Such an arrangement is exemplified in Figs. 4 and 5 wherein the compartment 20 is provided with suitable guides 29$^a$ between which the barrier 26$^b$ moves freely. Secured to the lower edge and forming part of the barrier is a float 27$^b$ which rises and falls thus varying the height of the outlet opening between the lower edge of the float and the bottom of the separating compartment. The guides 29$^a$ are provided with suitable stops 54. The upper portion of the barrier is cut away as at 60 and the lip 62 is bent downwardly to form a discharge outlet for the lighter of the materials being separated such as coal or ore. With this arrangement, one of the materials will be discharged over the lip 62 into a conveyer box 34$^a$ to be carried off by a conveyer shown diagrammatically at 36$^a$ and the heavier material will be discharged into a similar conveying box 30$^a$ to be carried off by a conveyer 32$^a$. In this form of the invention, it will be appreciated that the distance between the levels at which the two classes of materials to be separated are discharged remains constant. That is, when the float rises due to an accumulation of slate or refuse on the bottom of the separating compartment, the discharge lip 62 will also be raised and thus cut down the rate of discharge of the coal or ore.

In all the foregoing embodiments of the invention described, the float is secured to or forms practically an integral part of a vertically movable barrier which is free to move up and down between suitable guides or the like.

I contemplate, however, in some instances merely using a float which by itself will act as a barrier to control the rate of discharge of at least one of the materials being separated. Such an embodiment of the invention is illustrated in Figs. 6 and 7 wherein a fixed wall 64 extends transversely across the separating compartment and has its lower edge 66 terminating a short distance above the bottom of the separating compartment. Guide rods 68 are suitably secured to the bottom of the separating compartment and have their upper ends 70 bent at an angle as shown in Fig. 6. The float 27$^c$, it will be appreciated, is free to rise and fall in response to the volume of slate or gangue which accumulates on the bottom of the separating compartment. In this form of device as also in the case illustrated in Figs. 2 to 5, the wall 52 of the separating compartment is cut away to form a discharge port 69 whose outlet area may be varied by raising or lowering a transversely extending plate 70 which may be secured in its adjusted position by means of suitable bolts 72.

In Figs. 8 and 9 I have illustrated a modification wherein the transverse wall 64$^a$ of the separating compartment 20 is fixed and near the lower end thereof is pivoted a plate 74 having a float 27$^d$ secured thereto which float is adapted to act as a barrier to control the rate of discharge of one of the materials being separated. In Fig. 8 the float is shown as located between the outer wall 52 of the separating compartment and the wall 64$^a$ thereof, while in Fig. 9 the float and plate 74 are illustrated as being assembled in relation to the other parts so that they extend inwardly toward the interior separating compartment.

From the foregoing, it will be apparent that the barrier rises and falls automatically according to the percentage of accumulated slate or gangue on the bottom of the tank 20 and entirely eliminates the human element which enters into the operation of hand-operated barriers. The apparatus is of simple construction, the float being formed of either a casting or tubing both of which can be inexpensively produced and yet perform their function effectively. While the float shown is cylindrical in form and is of hollow construction, it need not necessarily be so made, it being apparent that if desirable, it can be of various cross-sectional shapes such as square, rectangular and triangular as will be understood and may be solid instead of hollow. The float of course can be constructed of various materials such as wood or the like without departing from the invention.

Though I have described with great particularity certain specific embodiments of the invention shown, it is not to be construed that I am limited thereto as changes in the arrangement and modifications may be made by those skilled in the art without departing from the invention as defined in the appended claims.

What I claim is:—

1. In a hydraulic jig separator of the class described, a combined barrier and float consisting of a vertically movable plate having a bouyant member secured to its lower extremity, said member defining one side of the port or opening through which one of the materials is discharged.

2. In a hydraulic jig separator including a separating compartment and means for forcing the water upwardly therethrough, discharge outlets at different levels in said compartment for the materials to be separated, and a combined barrier and float consisting of a vertically movable plate having a bouyant member secured at its lower end which defines one side of the port or opening through which one of the materials is discharged.

3. A device of the class described including a separating compartment and means for hydraulically stratifying the materials by flotation in said compartment, in combination with a barrier comprising a plate having its upper edge arranged to control the discharge of one of the materials being separated and the opposite edge having a float rigidly secured directly thereto and adapted to define the size of the port through which one of the materials passes and to raise and lower the same.

4. A device of the class described including a separating compartment and means for hydraulically stratifying the materials by flotation in said compartment, in combination with a barrier having an upper lip over which one class of materials is discharged and having a float secured to the lower portion, said float forming a boundary for one discharge port controlling the rate of discharge of both classes of material being separated.

In witness whereof, I have hereunto signed my name.

EFFINGHAM P. HUMPHREY.